United States Patent [19]
Regan

[11] 4,359,679
[45] Nov. 16, 1982

[54] SWITCHING D-C. REGULATOR AND LOAD-SHARING SYSTEM FOR MULTIPLE REGULATORS

[75] Inventor: John F. Regan, Lombard, Ill.

[73] Assignee: Wescom Switching, Inc., Oak Brook, Ill.

[21] Appl. No.: 869,514

[22] Filed: Jan. 16, 1978

[51] Int. Cl.³ .......................................... H02M 3/335
[52] U.S. Cl. .................................. 323/272; 340/661; 363/26; 363/49; 363/56
[58] Field of Search ............... 323/17, 23, 25, DIG. 1, 323/267, 272, 282, 901; 363/24, 25, 26, 58, 125, 126, 71, 72, 49, 56, 97, 98, 124, 134; 340/660–663

[56] References Cited

U.S. PATENT DOCUMENTS

| | | | |
|---|---|---|---|
| 3,284,696 | 11/1966 | Nagata et al. | 363/126 X |
| 3,740,569 | 6/1973 | Garcia | 323/DIG. 1 |
| 3,818,307 | 6/1974 | Hamilton et al. | 323/23 X |
| 3,921,059 | 11/1975 | Birman et al. | 323/25 X |
| 3,978,393 | 8/1976 | Wisner et al. | 323/DIG. 1 |
| 4,034,280 | 7/1977 | Cronin et al. | 363/25 |

FOREIGN PATENT DOCUMENTS 1966627 7/1973 Fed. Rep. of Germany ........ 363/25

OTHER PUBLICATIONS

Eckhardt, "Regulator for Op Amp Practically Powers Itself", Electronics, Oct. 3, 1974, p. 106.

Primary Examiner—A. D. Pellinen
Attorney, Agent, or Firm—Leydig, Voit, Osann, Mayer & Holt, Ltd.

[57] ABSTRACT

In a system of parallel switching regulators sharing a common load, each regulator generates controllable pulses from an unregulated d-c. voltage source and then smoothing those pulses to form a d-c. output that varies according to changes in the pulses. A comparator controls the pulses according to the differential between a reference signal and a feedback signal, and an output resistor is connected between the comparator and the load. A reference signal source generates a reference signal for the comparator in a first one of the regulators, and the load side of the output resistor in the first regulator is connected to the feedback signal input to the comparator in that regulator so that the load voltage is determined by the reference signal for the first regulator. The comparator side of the output resistor in the first regulator is connected to the reference signal input to the comparator in a second one of the regulators, and the comparator side of the output resistor in the second regulator is connected to the feedback signal input to the comparator in the second regulator so that the current supplied to the load by the second regulator is equal to the current supplied by the first regulator.

10 Claims, 5 Drawing Figures

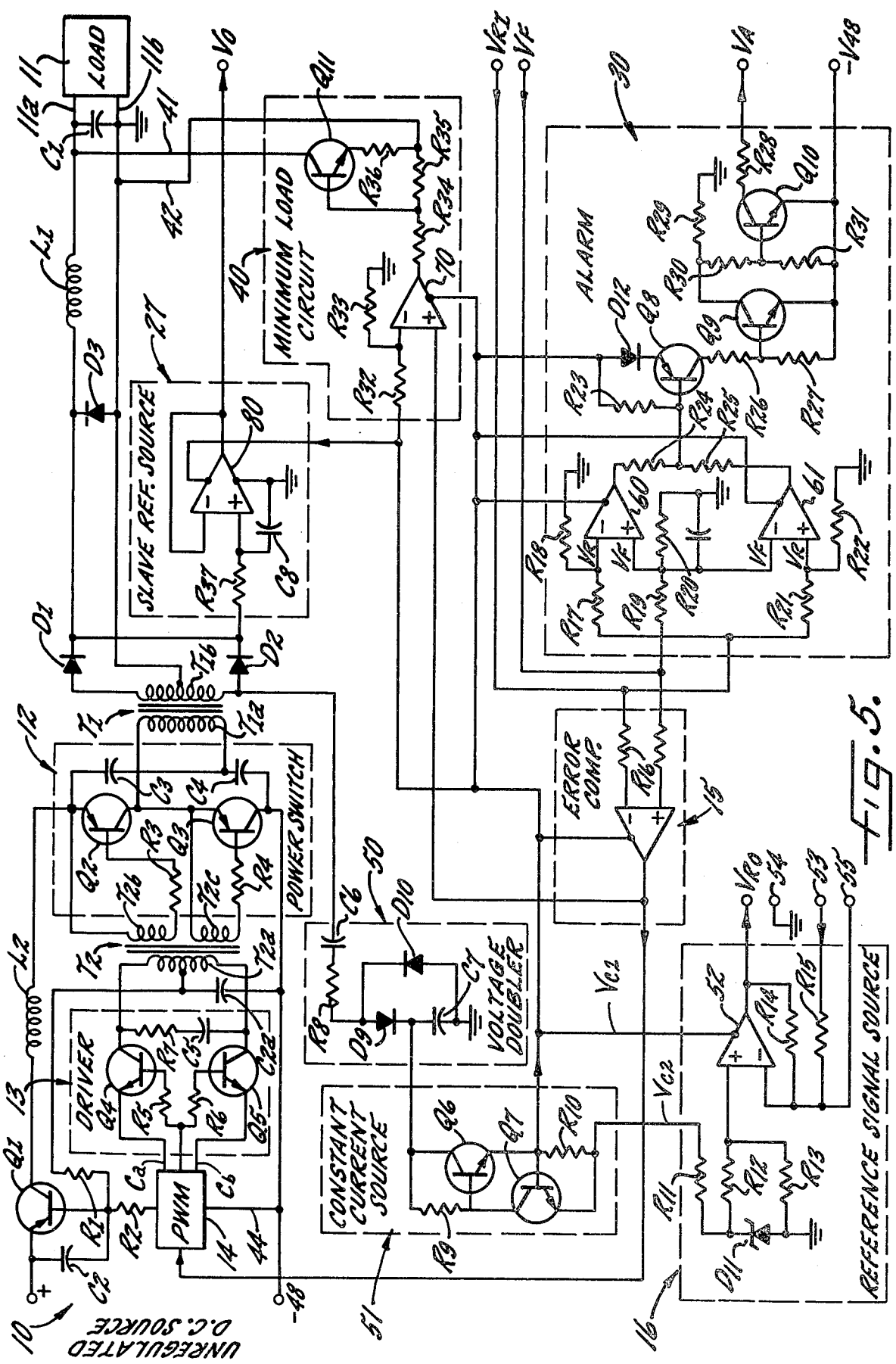

SWITCHING D-C. REGULATOR AND LOAD-SHARING SYSTEM FOR MULTIPLE REGULATORS

BRIEF SUMMARY OF THE INVENTION

The present invention relates to switching d-c. regulators for supplying power at regulated voltage or current levels, and to parallel and series arrangements of such regulators.

It is a primary object of this invention to provide an improved load sharing arrangement of two or more switching regulators that supply power to a common load. In this connection, one specific object of the invention is to provide an improved switching regulator which can be used interchangeably with similar regulators in a load sharing arrangement, so that there is no need for different master and slave regulators.

Another object of the invention is to provide an improved load sharing arrangement of two or more switching regulators that ensures equal sharing of the load by all the regulators under varying conditions at the load and/or the primary power source.

It is another object of this invention to provide an improved switching regulator that furnishes full regulation all the way down to a "no-load" condition, and does not require any minimum external load to be maintained on the regulator.

A further object of the invention is to provide an improved switching regulator that produces an alarm signal in response to deviation of the regulated voltage or current above or below the regulated level by a predetermined amount, without requiring manual adjustment of the alarm level every time the regulation level is changed. In this connection, a related object of the invention is to provide a load sharing arrangement of two or more such regulators that produces a separate alarm signal for each individual regulator that deviates from the regulated voltage or current level by the predetermined amount, so that the particular regulator responsible for any alarm signal is immediately pinpointed.

Still another object of the invention is to provide a switching regulator that utilizes transformer coupling with minimal internal power losses and maximum efficiency. A related objection of the invention is to provide such an improved switching regulator that minimizes the size of the required transformer.

A still further object of the invention is to provide an improved switching regulator that avoids arcing at its input terminals when it is first connected to a power source, by making such connection "softly".

Yet another object of the invention is to provide a switching regulator of the foregoing type that provides an improved internal power supply for its internal circuitry.

DESCRIPTION OF THE DRAWINGS

These and other objects and advantages of the invention will become apparent as the following description proceeds with reference to an exemplary embodiment illustrated in the accompanying drawings, in which:

FIG. 5 is a more detailed schematic diagram of one specific system that follows the block diagram shown in FIG. 1.

While the invention has been shown and will be described in some detail with reference to a preferred and exemplary embodiment, there is no intention to thus limit the invention to such detail. On the contrary, it is intended to cover all alternatives, modifications and equivalents which fall within the spirit and scope of the appended claims.

DETAILED DESCRIPTION

Figure 1:
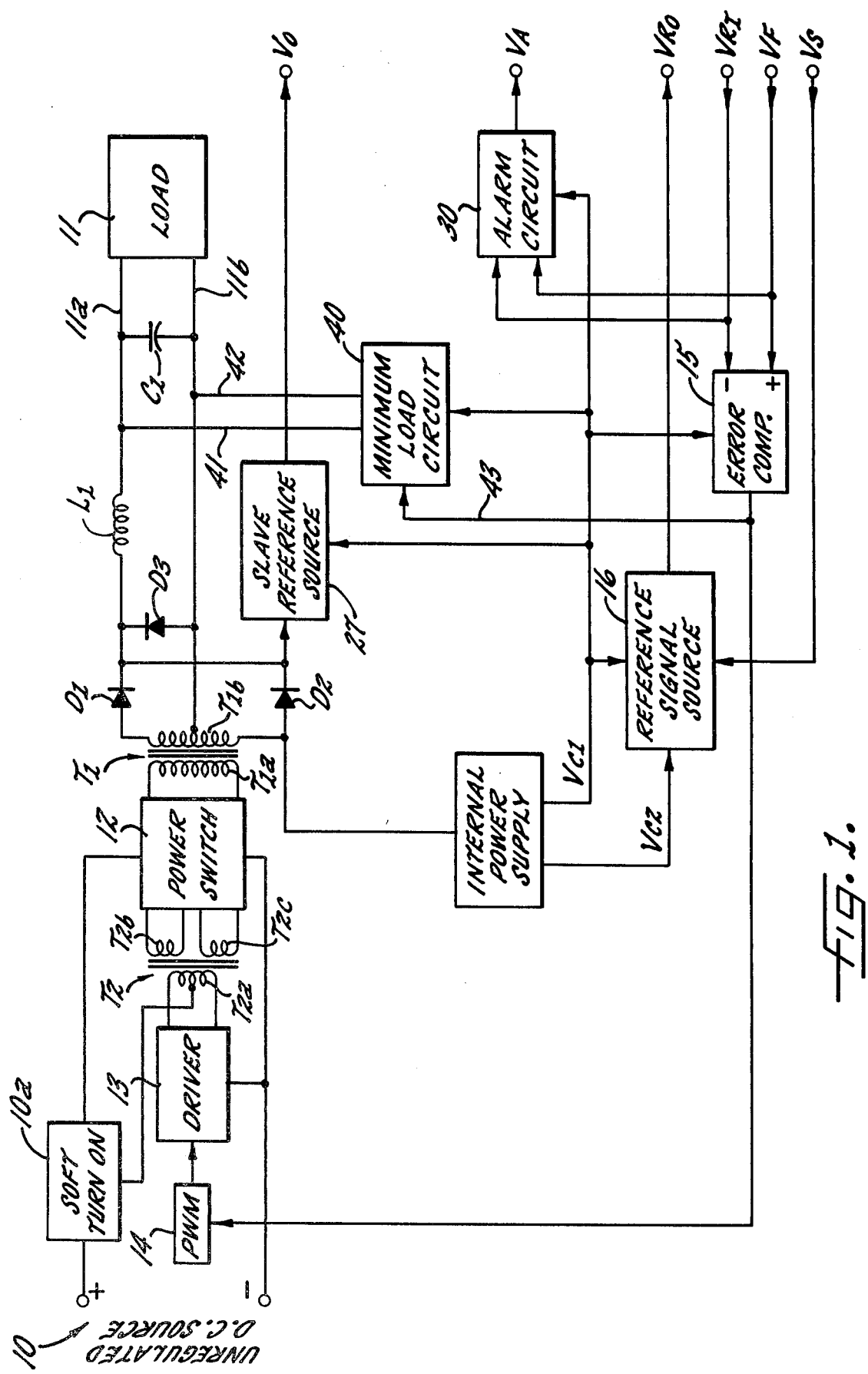
FIG. 1 is a block diagram of a switching d-c. regulator embodying the invention.

Turning now to the drawings and referring first to FIG. 1, there is illustrated a switching regulator for furnishing d-c. power from an unregulated d-c. source 10 to a load 11 at a regulated voltage level. For example, the unregulated d-c. source 10 may represent an office battery in a telephone communication system, which is inherently subject to various fluctuations in the power furnished to the regulator. The source 10 is connected through a soft turn-on circuit 10a to a power switch 12 which is switched on and off by a driver 13 to generate a series of pulses with alternating positive and negative polarity in the primary winding of a transformer T1. These pulses are supplied to a pair of rectifying diodes D1 and D2 from the secondary winding of the transformer T1, and the output of the diodes D1 and D2 is smoothed by a filter comprising an inductor L1 and a capacitor C1 to form a d-c. output that varies in magnitude according to changes in the width of the pulses generated by the power switch 12. This d-c. output is developed across a pair of output lines 11a and 11b connected to the load 11. Although the use of the transformer T1 between the power switch 12 and the output filter is well known in the art, it should be noted that the use of a transformer in this manner is desirable to provide isolation between the input and output, and to permit both positive and negative outputs to be derived from the same regulator.

Control of the magnitude of the d-c. output is achieved by modulating the width of the drive pulses supplied to the power switch 12 from the driver 13, thereby modulating the width of the corresponding power pulses supplied to the transformer T1. Modulation of the drive pulses is in turn controlled by a pulse width modulating or "PWM" circuit 14 that is responsive to an "error" feedback signal from an error comparator 15. This comparator 15 continuously compares a signal $V_F$, representing the level of the actual output voltage across the load 11, with a preselected reference level $V_{RI}$ representing the desired output, and produces an "error" signal whenever the actual output level deviates from the reference level.

Thus, the pulses generated by both the driver 13 and the power switch 12 are produced at a constant frequency, but the width of the pulses is continuously modulated to maintain the output voltage at a substantially constant level. More specifically, when the current demanded by the load 11 increases, or when the voltage of the unregulated d-c. source 10 decreases, the resulting change in the level of the feedback signal $V_F$ increases the width of the pulses generated by the power switch 12. This increase in the pulse width increases the magnitude of the d-c. output voltage, thereby holding the output voltage at a substantially constant level. Conversely, when the current demanded by the load 11 decreases, or when the voltage of the unregulated d-c. source 10 decreases, the resulting change in the level of the feedback signal $V_F$ decreases the width of the pulses generated by the power switch 12. This decreases in the pulse width decreases the magnitude of the d-c. output voltage, again maintaining a substantially constant level of output voltage. Consequently, the level of the output voltage across the load is maintained essentially constant in spite of variations in the load 11 or the input source 10. As the width of the pulses increases, the magnitude of the d-c. output voltage increases; and as the width of the pulses decreases, the magnitude of the d-c. output voltage also decreases.

To generate the requisite feedback signal $V_F$, a resistor (not shown) may be connected in parallel with the load 11. The voltage drop across this sensing resistor will then vary in proportion to any variations in the voltage across the load, producing a voltage $V_F$ representing an "actual voltage" signal. This "actual voltage" signal $V_F$ is continuously applied to the non-inverting input of the comparator 15. The other input signal to this comparator 15 is the reference or "command" signal $V_{RI}$ derived from the output $V_{RO}$ a conventional reference voltage source 16 and applied to the inverting input of the comparator 15. Thus, the comparator 15 continuously monitors the "actual voltage" signal $V_F$ and produces an "error" signal whenever the signal $V_F$ deviates from the reference level $V_{RI}$. The magnitude of this "error" signal is proportional to the difference between the levels of $V_F$ and $V_{RI}$.

This "error" signal from the comparator 15 is applied to the pulse width modulating circuit 14 which causes the width of the drive pulses applied to the power switch 12 to be modulated according to the magnitude of the "error" signal. The PWM circuit 14 is available in the form of a linear integrated circuit on a single monolithic chip such as the SG1524, SG2524 or SG3524 "Regulating Pulse Width Modulator" available from Silicon General Inc. or Texas Instruments Inc. One of these integrated circuit chips includes all the circuitry needed to cause the driver 13 to supply the primary winding T2a of a transformer T2 with variable width pulses which modulate the width of the power pulses generated by the switch 12 in proportion to variations in the magnitude of the "error" signal from the comparator 15.

In accordance with one important aspect of the present invention, two or more of the switching regulators are connected to a common load through separate output resistors, the voltage level on the load side of the output resistor of one regulator is used as the feedback signal for that regulator so that the load voltage is determined by the reference signal for the first regulator, the voltage level on the regulator side of the output resistor of the first regulator is used as the reference signal for a second regulator, and the voltage level on the regulator side of the output resistor of the second regulator is used as the feedback signal for the second regulator so that the current supplied to the load by the second regulator is equal to the current supplied by the first regulator.

Figure 2:
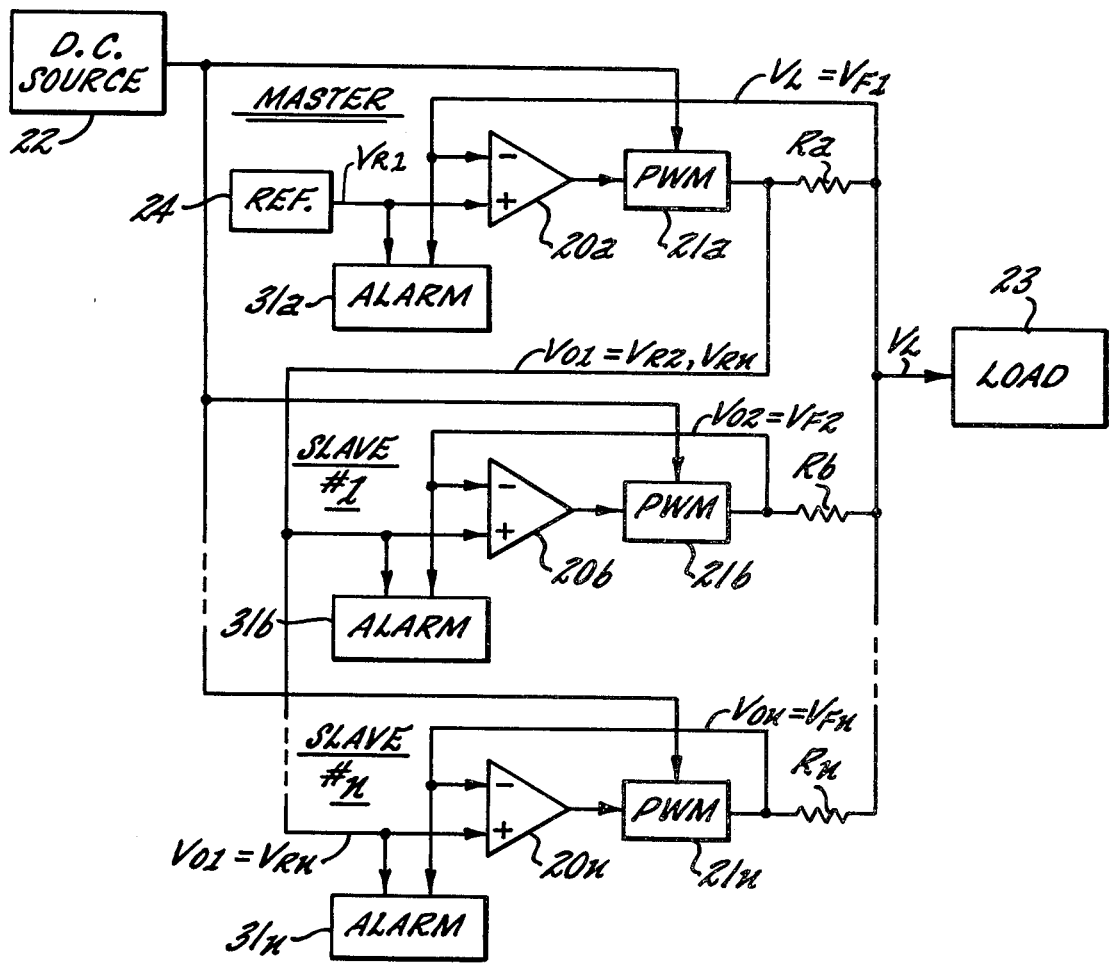
FIG. 2 is a simplified schematic diagram of multiple switching regulators (of the type shown in FIG. 1) connected in parallel to a common load.

To simply the explanation of this load-sharing arrangement for two or more regulators, multiple regulators have been illustrated in simplified form in FIG. 2 as comprising (1) comparators 20a, 20b . . . 20n receiving feedback signals $V_{F1}$, $V_{F2}$ . . . $V_{Fn}$ and reference levels $V_{R1}$, $V_{R2}$ . . . $V_{Rn}$; (2) PWM control and switching circuits 21a, 21b . . . 21n connected between an unregulated d-c. source 22 and a load 23 and receiving the outputs of the respective comparators 20a, 20b . . . 20n and (3) equal output resistors Ra, Rb . . . Rn connected between the respective comparators 20a, 20b . . . 20n and the load 25. Although these comparators 20a, 20b . . . 20n and PWM circuits 21a, 21b . . . 21n correspond generally to the error comparator 15 and the PWM-controlled switching circuitry in the system of FIG. 1, it should be understood that as used in FIG. 2 the comparators and the PWM circuits symbolically represent entire regulators, including the drivers, the power switches, the coupling transformers and the filters or other circuitry for smoothing the width-modulated pulses. It should also be understood that in the system shown in FIG. 1 the output resistance represented by Ra, Rb . . . Rn for the respective regulators in FIG. 2 is provided by the resistance of the output inductor L1, so that the voltage Vo in FIG. 1 (corresponding to the output voltages Vo1, Vo2 . . . Von in FIG. 2) is derived from the transformer side of L1.

FIG. 2 illustrates the parallel connection of a master regulator (represented by comparator 20a and PWM circuit 21a) and slave regulators (represented by comparators 20b, 20n and PWM circuits 21b, and 21n) for supplying the common load 23 with a regulated voltage $V_L$ corresponding to a reference level $V_{R1}$. As can be seen in FIG. 2, the comparator 20a in the master regulator receives its reference level $V_{R1}$ from an independent reference source 24, and the feedback signal $V_{F1}$ for this comparator 20a is the load voltage $V_L$. Thus, the master regulator will maintain the load voltage $V_L$ at the reference level $V_{R1}$. The reference levels $V_{R2}$, $V_{Rn}$ for comparators 20b, 20n in the slave regulators is the output voltage $V_{O1}$ from a slave reference source 27 (FIG. 1) in the master regulator, which is proportional to the voltage on the regulator side of the resistor Ra, which in turn is proportional to the current output of the master regulator. The feedback signals $V_{F2}$, $V_{Fn}$ for the comparators 20a, 20n in the slave regulators are their own output voltages $V_{O2}$, $V_{On}$ so that the slave regulators function as voltage followers.

The use of the master regulator output voltage $V_{O1}$ as the reference levels $V_{R2}$, $V_{Rn}$ for the slave regulators, combined with the connection of the slave regulators as voltage followers, causes the voltage $V_{O2}$, $V_{On}$ on the regulator sides of the slave output resistors Rb, Rn to rigidly follow the voltage level $V_{O1}$ on the regulator side of the master output resistor Ra. Since the resistors Ra, Rb . . . Rn are all equal, the equal voltage levels $V_{O1}$, $V_{O2}$ . . . $V_{On}$ cause the current outputs of the slave regulators to rigidly follow the current output of the master regulator. The feedback signal $V_{F1}$ to the master regulator is the load voltage $V_L$ supplied by both regulators so that the master regulator maintains the load voltage $V_L$ at the master reference level $V_{R1}$. If the load voltage $V_L$ rises above the master reference level $V_{R1}$, the master regulator reduces its current output, thereby reducing the output voltage $V_{O1}$ which is the reference level for the slave regulators. Consequently, the current outputs of the slave regulators follow the reduction in the current output of the master regulator so that the total reduction in the current supplied to the load is shared evenly by all the regulators. Similarly, if the load voltage $V_L$ drops below the level of the master reference level $V_{R1}$, the master regulator increases its current output and causes a corresponding increase in the current outputs of the slave regulators, so that again the load change is shared evenly by all the regulators.

It will be appreciated from the foregoing description that the master and slave regulators are completely interchangeable, so it is not necessary to manufacture two different (e.g., master and slave) regulators for load-sharing applications. By simply changing the reference and feedback connections of the regulators, the roles of the master and slave regulators may be reversed, and the load will still be evenly shared by all the regulators. The ability of the system to split the load evenly among the regulators is strictly a function of the equality of the resistance values of the output resistors Ra, Rb . . . Rn, which can, of course, be held within very close manufacturing tolerances.

As another feature of the invention, the output resistors Ra, Rb . . . Rn are made of a material which has a positive temperature coefficient of resistance. Then if one resistor happens to have a slightly smaller resistance value than the other resistors so that the currents through the resistors are uneven, the resulting uneven heating of the resistors will produce corresponding uneven voltages on the comparator sides of the resistors. For example, if the resistor Ra is slightly greater than the resistor Rb, more current must be passed through Rb than Ra to equalize the output voltages $V_{O1}$ and $V_{O2}$ (as required by the comparator 21), thereby heating Rb to a higher temperature than Ra. This higher temperature will increase the resistance of Rb toward the resistance of Ra, thereby reducing the current flow through Rb without changing $V_{O2}$. The reduction in current flow through Rb reduces the slave regulator's share of $V_L$, thereby requiring an increase in the current from the master regulator via Ra. Consequently, the positive temperature coefficient of resistance of the output resistors Ra and Rb causes the current outputs of these regulators to tend to equalize in spite of a slight mismatch in the values of the resistors Ra and Rb.

Although the load sharing arrangement of the present invention has been described above with specific reference to the use of equal output resistors to provide equal load sharing, it should be noted that the unequal output resistors could be used to provide unequal but controlled load sharing. For example, if Ra were twice the value of Rb, the master regulator would still deliver the current required to produce a $V_L$ equal to $V_{F1}$, but the voltage drop across Ra would be twice as high as the voltage drop across Rb if both regulators were delivering the same current to the load 25. Thus, the voltage levels $V_{O1}$ and $V_{O2}$ are both double what they would be if Ra were the same value as Rb, thereby producing a current through Rb that is twice the magnitude of the current through Ra. Thus, it can be seen that the currents supplied to the load 25 by the respective regulators will be in direct proportion to the values of the respective output resistances. It should also be noted that the relative proportions of the load borne by the parallel regulators can be further adjusted by the addition of voltage dividers in the feedback loops and/or in the cross coupling of the output voltage from the master regulator to the slave regulators.

Figure 3:
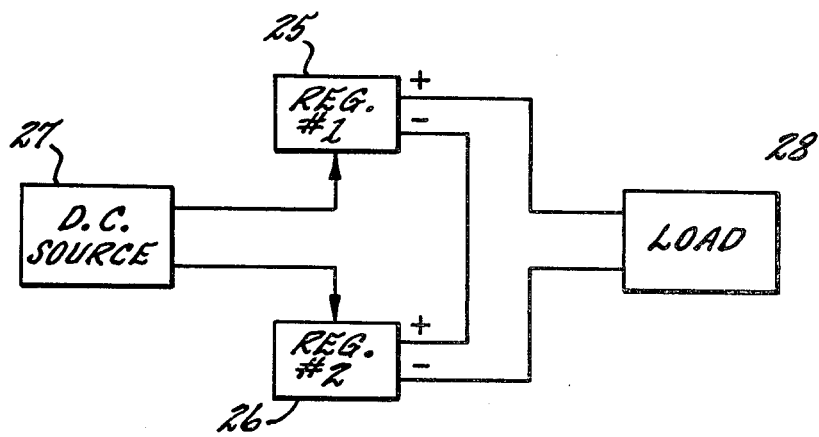
FIG. 3 is a block diagram of two switching regulators (of the type shown in FIG. 1) connected in series to a common load.

As illustrated in FIG. 3, two or more of the regulators provided by this invention can also be connected in series. Thus, FIG. 3 shows two regulators 25 and 26 powered by the common source 27 and serving the common load 28. In this illustration, both the positive and negative lines have been shown on both the input and output sides of the regulators 25 and 26 to more clearly illustrate how the outputs of the two regulators are connected in series with the load.

In accordance with a further aspect of the invention, the regulator is provided with an alarm circuit for producing an alarm signal in response to a predetermined deviation between the reference and feedback signals to the error comparator of the regulator. Thus, the alarm circuit 30 shown in FIG. 1 receives the same reference level $V_R$ and the same feedback signal $V_F$ that are supplied to the error comparator 15. Whenever the feedback signal $V_F$ and the reference level $V_R$ deviate from each other by more than a predetermined percentage (e.g., 2%), the alarm circuit 30 senses this excess deviation and produces an alarm signal $V_A$. Because the alarm circuit 30 receives the same reference level $V_R$ that sets the level at which the power output is regulated, the threshold level of the alarm circuit is automatically adjusted whenever the regulator output is changed to a difference reference level by adjusting $V_R$. Moreover, the alarm circuit 30 is responsive to excessive deviations of the feedback signal $V_F$ in either direction from the reference level $V_R$, or to excessive deviations of the reference level in either direction from the feedback signal $V_F$ (due to a malfunction in the reference source, for example).

In FIG. 2, separate alarm circuits 31a, 31B . . . 31N are shown for the master and slave regulators. In each regulator, the alarm circuit 31 receives the same reference and feedback signals $V_R$ and $V_F$ that the corresponding comparator 20 receives. Since each alarm circuit 31 produces its own separate alarm signal, the appearance of an alarm signal normally pinpoints the particular regulator responsible for the condition that initiated the alarm signal.

As a further feature of the invention, the regulator includes a minimum load circuit which automatically connects a simulated minimum load to the regulator in the event that the actual load drops so low that it causes the regulator output voltage to increase more than a predetermined amount above the reference level. In most switching regulators, it is customary to specify that a certain minimum load must always be maintained on the regulator in order to sustain a regulated output. If the load is removed entirely, the output voltage rises to the peak level of the signal produced in the secondary transformer winding T1b by the power switch 12 (the power switch 12 must continue to operate in order to supply power to the internal circuitry of the regulator). More specifically, the continued output of the power switch 12 charges the filter capacitor C1 in the regulator toward the peak value of the signal in winding T1b, and this charge on C1 is then discharged through whatever load happens to be re-connected to the regulator. The surge of power from this capacitor discharge can have disastrous results on the load, e.g., it can destroy low-power logic components and the like. Such results can be avoided by connecting a resistor across the regulator output, but the power dissipated in this resistor seriously degrades the efficiency of the regulator.

Thus, in the system shown in FIG. 1 a minimum load circuit 40 is connected across the regulator output via lines 41 and 42, and this circuit 40 receives the output of the error comparator 15 via line 43 as a control signal. Whenever the error control signal on line 43 reaches a preselected magnitude, indicating that the load current has decreased to a minimum level, the minimum load circuit 40 is activated to connect a simulated minimum load across the regulator output via lines 41 and 42. When the actual external load current increases sufficiently to increase the error control signal on line 43, the minimum load circuit is deactivated. During normal operation of the regulator, the minimum load circuit 40 is inactive, i.e., it appears as an open circuit to the regulator output, so there is no power dissipation in the minimum load circuit to degrade the efficiency of the regulator.

In accordance with still another aspect of the invention, the efficiency of the regulator is improved by connecting a Schottky diode D3 from the center tap of the secondary transformer winding T1b to a point between the rectifying diodes and the LC filter. A diode in this position is often referred to as a "catch" diode, and its purpose is to conduct the current that is caused to flow through the LC filter by the e.m.f. of the inductor in the intervals between successive pulses from the power switch 12. Schottky diodes have lower forward losses than conventional diodes, and thus the use of a Schottky diode as the catch diode improves the overall efficiency of the regulator by as much as 5% or more, depending on the duty cycle of the PWM circuitry. The low forward loss of the Schottky diode is considerably lower than the losses that would occur in the rectifying diodes D1 and D2 and in the transformer T1 in the intervals between successive pulses from the power switch 12.

Schottky diodes have been previously used as rectifying diodes, i.e., in place of the diodes D1 and D2, but the Schottky diodes are suitable for use only at relatively low voltage levels, e.g., below 50 volts. Even when the regulator shown in FIG. 1 is designed to produce a 12-volt output, the rectifying diodes D1 and D2 are subjected to voltage spikes in excess of 50 volts, and thus Schottky diodes cannot be used as the rectifying diodes D1 and D2 in most applications. However, by using a Schottky diode as the catch diode, significant improvements in efficiency can still be realized, particularly when the regulator has a relatively short duty cycle.

Figure 4:
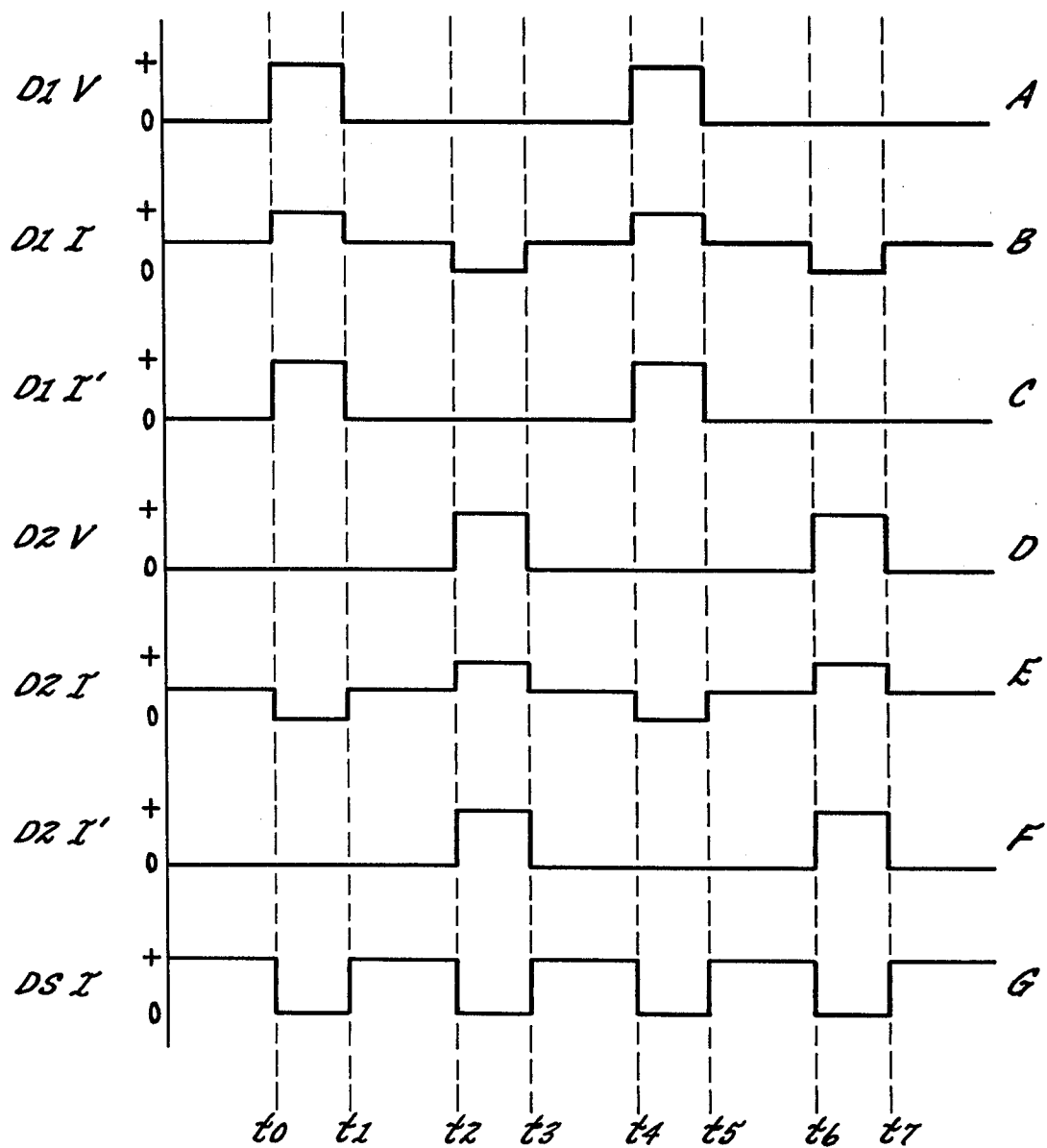
FIG. 4 is a series of waveforms illustrating operation of a portion of the system shown in FIG. 1.

The benefits of using a Schottky diode as the catch diode can be more clearly appreciated from the waveforms in FIG. 4. Waveforms A and D represent the voltage drops across the rectifying diodes D1 and D2, and waveforms B and E represent the corresponding currents through these diodes in the absence of the catch diode D3. The relatively high current levels in intervals $t_0$-$t_1$ and $t_4$-$t_5$ in waveform B, and in intervals $t_2$-$t_3$ and $t_6$-$t_7$ in waveform E, are due to the power pulses from the switch 12. In the intervening intervals of waveforms B and E, i.e., $t_1$-$t_2$, $t_3$-$t_4$ and $t_5$-$t_6$, current flows through both diodes D1 and D2 (at a lower level) due to the e.m.f. of the inductor L1; the current is the same through both diodes D1 and D2 in these intervening intervals because the diodes are in parallel with each other, and thus the current is evenly divided between them. Of course, this current also flows through the secondary winding T1b of the transformer T1.

With the addition of the Schottky diode D3, the only current flow through the rectifying diodes is in the intervals $t_0$-$t_1$, $t_2$-$t_3$, $t_4$-$t_5$ and $t_6$-$t_7$, as illustrated by waveforms C and F. In the intervening intervals $t_1$-$t_2$, $t_3$-$t_4$ and $t_5$-$t_6$, the entire current flow is through the Schottky diode, as illustrated by waveform G. Because the forward loss of the Schottky diode D3 is considerably lower than that of the rectifying diodes D1 and D2, and because the current that flows through the Schottky diode D3 does not pass through the transformer winding T1b, it can be seen that the Schottky diode significantly reduces the losses in the intervals $t_1$-$t_2$, $t_3$-$t_4$ and $t_5$-$t_6$. As mentioned previously, this improvement can increase the total regulator efficiency by more than 5% when relatively short duty cycles, e.g., on the order of 20%, are used.

Turning next to FIG. 5, there is shown a more detailed schematic diagram of preferred circuitry for the system illustrated in FIG. 1. The unregulated d-c source 10 is connected to the power switch 12 via a transistor Q1 which forms a part of the soft turn-on circuit 10a for holding the main power circuit open for a short interval following connection of the regulator to the source 10, to prevent arcing across the connecting terminals of the source 10 and the regulator. It is important to prevent such arcing because the resulting damage to the connecting terminals can seriously degrade the efficiency and performance of the regulator.

Thus, in accordance with a further aspect of the invention, the emitter and collector of the transistor Q1 are connected to the source 10 and the power switch 12, respectively, for controlling the supply of power from the source to the power switch; the base of the transistor Q1 is connected to the PWM circuit 14 so that current flow through the emitter-base junction of the transistor supplies d-c. power to these circuits regardless of whether current is flowing between the emitter and the collector; and a capacitor is connected in parallel with the emitter-base junction of the transistor Q1 for supplying a-c. start-up power to the driver circuit 13 and for delaying the flow of current through the emitter-collector junction for a brief interval after the connection of the emitter to the d-c. source 10. As shown in FIG. 5, the emitter and collector of the transistor Q1 are connected in series with the positive terminal of the source 10 and the power switch 12. The base of the transistor Q1 is connected via resistor R1 to the center tap of the primary winding T2a of the transformer T2 which couples the driver circuit 13 to the power switch 12, and the base of Q1 is also connected to the PWM circuit 14 via resistor R2. Consequently, a small amount of d-c. power is supplied to the PWM circuit 14 through the emitter-base junction of the transistor Q1 as soon as the regulator is connected to the source 10. However, this current is so small that it does not cause any significant arcing across the connecting terminals between the emitter and the source 10.

In order to delay the conduction of current through the emitter-collector junction of the transistor Q1 to the power switch 12, a capacitor C2 is connected from the emitter of Q1 to the base of Q1 and the junction between the resistors R1 and R2. Thus, when the regulator is connected to the source 10, conduction across the emitter-collector junction of Q1 is delayed until the capacitor C2 has been charged to a level sufficient to cause the transistor Q1 to turn on. This initial delay in the flow of current through the power circuit prevents arcing across the connecting terminals between the regulator and the source 10 when these terminals initially contact each other. During this delay interval, a-c. start-up power is supplied to the center tap of the transformer T2a via the capacitor C2. Thus, by the time current begins to flow through the emitter-collector junction of Q1 to the power switch 12, the PWM circuit 14 and the driver 13 are already supplying the requisite control pulses to the power switch 12.

The illustrative power switch circuit shown in FIG. 5 is a half bridge regulator converter comprising a pair of transistors Q2 and Q3 connected in series with each other across the positive and negative rails of the source 10. Each of the transistors Q3 and Q4 has its emitter and collector connected in a current loop with the primary transformer winding T1a and a capacitor C3 or C4. Pulses in the transformer windings T2b and T2c turn the transistors Q2 and Q3 alternately on and off to supply pulses of current in opposite directions through the power transformer winding T1a. More specifically, transistor Q2 is turned on by a pulse in the winding T2b (via resistor R3 connected to the base of Q2); then both transistors Q2 and Q3 are turned off by the absence of pulses in both the secondary transformer windings T2b and T2c; then transistor Q3 is turned on by a pulse in winding T2c (via resistor R4 connected to the base of Q3); and finally both transistors are turned off again before the cycle is repeated by another pulse in winding T2b.

When the power turn-on transistor Q1 is first rendered conductive to supply current to the power switch 12, both the capacitors C3 and C4 are charged to voltage levels that remain essentially constant as long as the regulator is in operation. An inductor L2 in series with the emitter-collector circuit of the transistor Q1 ensures that the capacitors C3 and C4 remain charged, and also serves to filter transients arising in the power switch 12 and thereby prevent such transients from interfering with other circuitry associated with the source 10. Each time the transistor Q2 is turned on in response to a pulse in the coil T2b, current flows from the positive side of the capacitor C3 through the emitter and collector of Q2, through the primary transformer winding T1a, and back to the negative side of the capacitor C3. Thus, current flow in this loop is downwardly through the winding T1a, as shown in FIG. 5. Each time the transistor Q3 is turned on, current flows from the positive side of the capacitor C4 through the winding T1a, through the emitter and collector of Q3, and back to the negative side of capacitor C4. Thus, the direction of current flow in this loop is upwardly through the winding T1a as viewed in FIG. 5. Consequently, it can be seen that as the transistors Q2 and Q3 are turned alternately on and off, current pulses of alternating polarity are supplied to the winding T1a. As will be apparent from the ensuing discussion, the width of these pulses supplied to the windings T1a is determined by the width of the pulses produced in the control winding T2b and T2c, which in turn are pulse-width-modulated by the PWM circuit 14.

To supply pulses alternately to the two windings T2b and T2c, the driver circuit 13 causes current to be passed from the center tap of the primary winding T2a through alternate halves of the winding T2a in response to successive pulses from the PWM circuit 14. As mentioned previously, a-c. current is supplied to the center tap of the windings T2a via the capacitor C2, and capacitor C2a provides an a-c. bypass to the negative rail. As will be appreciated by those familiar with this art, the PWM circuit 14 includes two internal NPN transistors whose collectors and emitters are all uncommitted, and whose bases alternately receive the internally generated PWM pulses. That is, these internal transistors are turned on and off in the same sequence described previously for the transistors Q2 and Q3 in the power switch circuit 12. Thus, alternate PWM pulses turn on one of the internal transistors, and the intervening pulses turn on the other internal transistor, with both transistors being turned off between each pair of successive pulses.

In the external driver circuit 13 illustrated in FIG. 5, a pair of NPN transistors Q4 and Q5 have their emitters connected to the respective collectors Ca and Cb of the uncommitted internal transistors, with the emitters of both the internal transistors being connected to the negative terminal of the source 10 via line 44. The external transistors Q4 and Q5 are included in the driver circuit simply because the internal transistors in the PWM circuit 14 have a relatively low breakdown voltage, e.g., 40 volts, as compared with a typical breakdown voltage of 200 volts for the external transistors Q4 and Q5. The bases of the two external transistors Q4 and Q5 both receive a constant biasing voltage from the PWM circuit 14 via respective resistors R5 and R6. A series RC circuit comprising resistor R7 and capacitor C5 is connected in parallel with the winding T2a to damp any ringing in the transformer T2 when neither of the transistors is turned on.

In operation, when the internal transistor having the collector Ca is turned on, current flows from the center tap of the transformer winding T2a through the upper half of that winding and on through the transistor Q4 and the corresponding internal transistor and line 44 to the negative rail. When the internal transistor having collector Cb is turned on, current flows from the center tap of winding T2a through the lower half of the winding and on through transistor Q5 and the corresponding internal transistor to line 44 and the negative rail. Thus, it can be seen that successive current pulses flow through alternate halves of the primary winding T2a, and in opposite directions, thereby inducing staggered pulses of alternating polarity in the control windings T2b and T2c.

The transformer T2 typically has a relatively high ratio of primary turns $N_p$ to secondary turns $N_s$ to step up the current supplied to the power-switching transistors Q2 and Q3. One of the important advantages of using this transformer coupling between the drive circuit and the power switching circuit is that the power-switching transistors Q2 and Q3 are turned on and off very quickly, because the transformer drives the transistors hard in both directions.

To provide an internal power supply for the regulator circuitry, one end of the secondary winding T1b of the power transformer T1 is connected to a conventional voltage doubler circuit 50 comprising a series arrangement of a capacitor C6, a resistor R8, a diode D9, and a second capacitor C7 to ground, with a second diode D10 connected in parallel with the diode D9 and capacitor C7. This circuit develops a voltage between the diode D9 and capacitor C7 which is approximately equal to the absolute peak-to-peak voltage of the signal produced at the lower end of T1b.

More specifically, when the signal from the transformer winding T1b is negative, the capacitor C6 is charged to that negative voltage level via diode D10 and resistor R8. When the signal from winding T1b goes positive, the diode D10 is reverse biased, and the absolute voltage across the capacitor C6 is the same as the absolute peak-to-peak voltage of the signal in the winding T1b. The diode D9 is forward biased during the positive segments of the signal, thereby charging the capacitors C7 to the absolute peak-to-peak voltage. The capacitor C7 maintains this voltage level essentially constant at the junction between the diode D9 and the capacitor C7.

The voltage developed by the voltage doubler circuit 50 at the junction between the diode D9 and the capacitor C7 is applied to a constant current source 51 comprising a pair of cross-coupled NPN transistors Q6 and Q7 with resistors R9 and R10 connected across the collector-base and base-emitter junctions, respectively, of the two transistors. As is known in the art, this circuit maintains essentially a constant current at the emitter of the transistor Q7. If the current through the resistor R10 begins to increase, the base current to the transistor Q7 decreases, reducing the base current to the transistor Q6, thereby reducing the current through transistor Q6 and resistor R10 to maintain a constant current level at the emitter of Q7. Conversely, if the current flow through resistor R10 decreases, the base current to the transistor Q6 increases, increasing the base current to the transistor Q6, thereby increasing the current through transistor Q6 and resistor R10 to again maintain a constant current level at the emitter of Q7.

In order to provide a very stable internal supply voltage, the constant current output from the circuit 51 is supplied through a resistor R11 to a temperature-compensated zener diode D11. The zener diode D11 tends to maintain a constant voltage level on the cathode side thereof, but this voltage is even more stable when the zener is supplied with a constant current. The zener diode D11 also provides temperature compensation to maintain the desired voltage level over a preselected temperature range. Thus a highly stable constant-voltage signal is produced on the cathode side of the diode D11.

In accordance with a further aspect of the present invention, the combination of the constant current circuit 51 and the zener diode D11 is also utilized to furnish a constant-voltage, variable-current internal power supply for the regulator circuitry. Thus, the internal power supply for the error comparator 15, the alarm circuit 30, the minimum load circuit 40, the reference signal source 16, and the slave reference source 27 is derived from the base of the transistor Q7. This internal supply voltage, which is designated $V_{C1}$ in FIG. 1, will supply the current required by the internal regulator circuitry, and yet the voltage level remains constant as a result of the constant voltage at the cathode of the zener diode D11 and the constant voltage drops across resistors R10 and R11 due to the constant current therethrough.

The constant-voltage constant-current signal produced on the cathode side of the zener diode D11 is utilized to develop the desired reference level $V_R$ for the regulator. Thus, the voltage level on the cathode of the zener diode D11 is divided by a pair of resistors R12 and R13 and applied to the non-inverting input of a differential amplifier 52 whose gain is set by a feedback resistor R14. The inverting input of this amplifier 52 is connected via resistor R15 to a terminal 53 which can be left open to produce a first reference level at $V_R$ or connected to ground via terminal 54 to produce a second (higher) reference level at $V_R$. As a further option, an external variable resistance can be connected to a terminal 55 to permit selection of other reference levels at $V_R$. The reference level $V_R$ is supplied to the error amplifier 15 via resistor R16, and to the alarm circuit 30, along with the feedback signal $V_F$.

Turning next to the alarm circuit 30, this circuit includes a pair of comparators 60 and 61, each of which receives both the feedback signal $V_F$ and the reference level $V_R$. These comparators 60 and 61 are identical except that the comparator 60 receives signal $V_F$ at its non-inverting input and level $V_R$ at its inverting input, and the comparator 61 conversely receives signal $V_F$ at its inverting input and level $V_R$ at its non-inverting input. Voltage dividers formed by resistors R17 and R18, R19 and R20, and R21 and R22 provide the appropriate input voltage levels for the respective comparators 60 and 61. Both comparators normally produce a low output, but the output of one of the comparators goes high whenever there is an excess deviation between $V_R$ and $V_F$.

More specifically, the output of comparator 60 goes high when $V_F$ rises above $V_R$ by a predetermined margin, and the output of comparator 16 goes high when $V_F$ drops below $V_R$ by a predetermined margin. For example, the comparators typically produce a high output when the signal $V_F$ deviates from the level of the signal $V_R$ by 2% or more.

Whenever the output of either comparator 60 or 61 goes high in response to an excessive deviation of $V_F$ from $V_R$, a transistor Q8 is switched from a normally conductive or "on" condition to a nonconductive or "off" condition. This transistor Q8 is a PNP transistor having its emitter connected via diode D12 to the internal power supply $V_{C1}$, and a resistor R23 is connected across its emitter-base junction to apply a forward bias across this junction. Thus, as long as the outputs of the comparators 60 and 61 remain low, the transistor Q8 is turned on. However, when one of the comparators 60 or 61 produces a high output, the resulting increased voltage applied to the base of the transistor Q8 via resistor R24 or R25 reverse biases the emitter-base junction of the transistor Q8, thereby turning Q8 off.

As long as the transistor Q8 is on, an NPN transistor Q9 is also held on because current flow in the emitter-collector circuit of transistor Q8 applies a forward bias to the base-emitter junction of the NPN transistor Q9. A resistor R26 limits the base current in transistor Q9, and a resistor R27 prevents transistor Q9 from being turned on by leakage through the transistor Q8. When transistor Q8 is turned off, the transistor Q9 is also turned off, thereby turning on a third transistor Q10 to activate an alarm circuit by producing a voltage $V_A$ across a resistor R28. Q10 is an NPN transistor that is normally turned off as long as transistor Q9 is conducting. When transistor Q9 is turned off, the base-emitter junction of transistor Q10 becomes biased in the forward direction to render Q10 conductive. A resistor R29 limits the base current in transistor Q10, and a resistive divider R30, R31 divides the saturated voltage of transistor Q9 for better noise margin.

As mentioned previously, the minimum load circuit 40 avoids the requirement for a minimum external load on the regulator. The particular circuit 40 shown in FIG. 5 includes a comparator 70 whose non-inverting input receives the "error" output signal from the error comparator 15. For a reference signal, the internal supply voltage $V_{C1}$ is applied across a voltage divider formed by resistors R32 and R33, with the junction between the two resistors being connected to the inverting input of the comparator 70 to supply a constant voltage level thereto. As the load 11 decreases and requires less and less power, the regulator output current required to maintain the load voltage at the regulated level also decreases. This decreases $V_F$, which in turn increases the "error" signal from the comparator 15. When this "error" signal increases to a level that represents a load below which regulation would be difficult to maintain, the signal level at the non-inverting input of the comparator 70 exceeds the constant signal level at the inverting input, and the comparator output switches from low to high.

The high output from the comparator 70 is divided by a pair of resistors R34 and R35 and applied to the base of a transistor Q11. This applies a forward bias to the transistor Q11, so that the transistor Q11 begins to draw current from the positive output line via line 41, the current path being completed by a resistor R36 and the line 42 leading back to the negative output line. The transistor Q11 and the voltage applied to the base thereof are selected to operate the transistor Q11 in its proportional region so that the current drawn by the transistor increases and decreases in direct proportion to changes in the output of the comparator 70, which in turn is proportional to changes in the "error" signal supplied to the comparator input. Thus, the combination of the comparator 70 and the transistor Q11 in effect apply a simulated load across the regulator output, and this simulated load varies inversely with changes in the actual load, as long as the comparator output remains high. When the load 11 rises above the level at which regulation can be effectively maintained, the "error" signal from the comparator 15 decreases accordingly, and the output of the comparator 70 returns to its low state, thereby turning off the transistor Q11.

For the purpose of generating a signal $V_O$ that is proportional to the regulator output current, for use in the load sharing arrangement shown in FIG. 2, the system of FIG. 5 includes a "slave reference source" circuit 27 comprising an operational amplifier 80 having its non-inverting input connected to the output of the rectifying diodes D1 and D2. A filter formed by a resistor R37 and a capacitor C8 smoothes the output of the diodes D1 and D2 to produce a d-c. reference level. The output of the amplifier 80 is connected to its inverting input, so that the amplifier functions as a voltage follower, producing an output signal $V_O$ proportional to the filtered output of the rectifying diodes D1 and D2.

As can be seen from the foregoing detailed description, this invention provides an improved load sharing arrangement of two or more switching regulators that supply power to a common load. Each regulator can be used interchangeably with similar regulators in the load sharing arrangement, so that there is no need for different master and slave regulators. The load sharing arrangement ensures equal sharing of the load by all the regulators under varying conditions at the load and/or the primary power source. The minimum load circuit furnishes full regulation all the way down to a "no-load" condition, and does not require any minimum external load to be maintained on the regulator. The alarm feature produces an alarm signal in response to deviation of the regulated output above or below the regulated level by a predetermined amount, without requiring manual adjustment of the alarm level every time the regulation level is changed. In the load sharing arrangement, a separate alarm signal can be generated for each individual regulator, so that the particular regulator responsible for any alarm condition is pinpointed. The use of the Shottky diode as the catch diode provides reduced internal power losses and maximum efficiency, and minimizes the size of the transformer required for any given output. The soft turn-on feature avoids arcing at the input terminals to the regulator when it is first connected to a power source, thereby providing more reliable performance of the regulator. Finally, an improved internal power supply is provided for the internal circuitry of the regulator by deriving a constant-voltage variable-current supply from the constant current source that is also connected to the zener diode to provide a constant-voltage constant-current signal for generating the primary reference signal for the regulator.

I claim as my invention:

1. A system of parallel switching regulators sharing a common load, each regulator including means for generating controllable pulses from an unregulated d-c. voltage source and then smoothing said pulses to form a d-c. output that varies according to changes in said pulses, a comparator for controlling said pulses according to the differential between a reference signal and a feedback signal, and an output resistor connected between the comparator and the load, said system comprising a reference signal source for generating a reference signal for said comparator in a first one of said regulators, means connecting the load side of the output resistor in said first regulator to the feedback signal input to the comparator in said first regulator so that the load voltage is determined by the reference signal for said first regulator, means connecting the comparator side of the output resistor in said first regulator to the reference signal input to the comparator in said second regulator, and means connecting the comparator side of the output resistor in said second regulator to the feedback signal input to the comparator in said second regulator so that the current supplied to the load by said second regulator is equal to the current supplied by said first regulator.

2. A system as set forth in claim 1 wherein said output resistors have positive temperature coefficients of resistance so that uneven heating of the output resistors in the parallel regulators due to uneven resistance values of said resistors and corresponding uneven current flows therethrough cause the resistance value of the lower valued resistor to increase and thereby equalize the current outputs of the parallel regulators.

3. A system as set forth in claim 1 wherein each of said regulators includes an alarm circuit for producing an alarm signal in response to a predetermined deviation between the feedback and reference signals to the corresponding comparator.

4. A system as set forth in claim 1 wherein the parallel regulators are identical to each other.

5. A system as set forth in claim 1 wherein said output resistors have equal resistance values so that said load is shared evenly by the parallel regulators.

6. A system as set forth in claim 1 wherein said reference signal source includes means for generating an internal reference voltage, comparison means receiving said internal reference voltage and a feedback voltage and producing the reference signal for the comparator in said first regulator, and a plurality of terminals for connecting different resistance values in parallel with the feedback line to said comparison means to adjust the level of said feedback voltage and thereby adjust the level of said reference signal for the regulator.

7. A system of parallel switching regulators sharing a common load, each regulator including means for generating controllable pulses from an unregulated d-c.

voltage source and then smoothing said pulses to form a d-c. output that varies according to changes in said pulses, a comparator for controlling said pulses according to the differential between a reference signal and a feedback signal, and an output resistor connected between the comparator and the load, said system comprising a reference signal source for generating a reference signal for said comparator in a first one of said regulators, means for supplying a signal representing the load voltage to the feedback signal input to the comparator in said first regulator so that the load voltage is determined by the reference signal for said first regulator, means for supplying a signal representing the current output of said first regulator to the reference signal input to the comparator in said second regulator, and means for supplying a signal representing the current output of said second regulator to the feedback signal input to the comparator in said second regulator.

8. In a switching regulator having means for generating controllable pulses from an unregulated d-c. voltage source and then smoothing said pulses to form a d-c. output that varies according to changes in said pulses, and a comparator for controlling said pulses according to the difference between a reference signal and a feedback signal, the improvement comprising an alarm circuit for producing an alarm signal in response to a predetermined deviation between said reference and feedback signals, said alarm circuit comprising a pair of comparators each receiving said reference and feedback signals, one of said comparators producing an output signal in response to a deviation of said feedback signal above said reference signal by a predetermined margin, and the other of said comparators producing an output signal in response to a deviation of said feedback signal below said reference signal by a predetermined margin, and means responsive to said output signal from either comparator for producing an alarm signal.

9. A switching regulator as set forth in claim 7 wherein said feedback signal represents the power output of the regulator.

10. In a system of parallel switching regulators sharing a common load, each regulator including means for generating controllable pulses from an unregulated d-c. voltage source and then smoothing said pulses to form a d-c. output that varies according to changes in said pulses, and a comparator for controlling said pulses according to the differential between a reference signal and a feedback signal, the improvement comprising a separate alarm circuit associated with each regulator for producing an alarm signal in response to a predetermined deviation between the reference and feedback signals to the corresponding comparator, said alarm circuit comprising a pair of comparators each receiving said reference and feedback signals, one of said comparators producing an output signal in response to a deviation of said feedback signal above said reference signal by a predetermined margin, and the other of said comparators producing an output signal in response to a deviation of said feedback signal below said reference signal by a predetermined margin, and means responsive to said output signal from either comparator for producing an alarm signal.

* * * * *